(12) United States Patent
Bandera

(10) Patent No.: US 7,586,229 B2
(45) Date of Patent: Sep. 8, 2009

(54) CONTINUOUS ROTARY MOTOR

(75) Inventor: Pablo Bandera, Goodyear, AZ (US)

(73) Assignee: Honeywell International Inc., Morristown, NJ (US)

( * ) Notice: Subject to any disclaimer, the term of this patent is extended or adjusted under 35 U.S.C. 154(b) by 92 days.

(21) Appl. No.: 11/850,525

(22) Filed: Sep. 5, 2007

(65) Prior Publication Data

US 2008/0111437 A1  May 15, 2008

Related U.S. Application Data

(60) Provisional application No. 60/859,819, filed on Nov. 15, 2006.

(51) Int. Cl.
*H02K 1/00* (2006.01)
(52) U.S. Cl. .................... 310/179; 310/49 R
(58) Field of Classification Search ........... 310/178, 310/156.64, 156.65, 49 R, 254, 114, 164
See application file for complete search history.

(56) References Cited

U.S. PATENT DOCUMENTS

| 5,130,595 | A | * | 7/1992 | Arora | 310/268 |
| 5,327,032 | A | * | 7/1994 | Esswein | 310/36 |
| 5,717,316 | A | * | 2/1998 | Kawai | 322/46 |
| 6,166,472 | A | * | 12/2000 | Pinkerton et al. | 310/208 |
| 2003/0030348 | A1 | * | 2/2003 | Lopatinsky et al. | 310/254 |

* cited by examiner

*Primary Examiner*—Michael C Zarroli
(74) *Attorney, Agent, or Firm*—Ingrassia Fisher & Lorenz, P.C.

(57) ABSTRACT

A motor includes a ferromagnetic member with first and second portions, a conductive wire wrapped around the first portions of the ferromagnetic member, and at least one magnet rotatably coupled to the ferromagnetic member having first and second poles and generating magnetic flux. The ferromagnetic member and the at least one magnet are configured such that at least a portion of the magnetic flux passes from the first pole of the at least one magnet, into the first portions of the ferromagnetic member, to the second portions of the ferromagnetic member, from the second portions of the ferromagnetic member, and into the second pole of the at least one magnet.

19 Claims, 10 Drawing Sheets

CONTINUOUS ROTARY MOTOR

TECHNICAL FIELD

The present invention relates to an electric motor, and more particularly, to a continuous rotary electric motor.

BACKGROUND

Rotary actuators, such as electric motors, are used in a wide variety of applications. Many modern technologies, such as microsatellites (or "microsats"), unmanned aerial systems, and homeland security surveillance devices, have increased the demand for electric rotary motors of reduced size that still provide high amounts of torque.

Conventional rotary electric motors include a series of electromagnets (e.g., on a stator), including conductive coils wrapped around ferromagnetic "teeth," arranged in a circular fashion and a series of permanent magnets (e.g., on a rotor), also arranged in a circular fashion, that are coupled to the electromagnets in such a way that they can rotate relative to the electromagnets. Typically, to cause rotation, current is conducted through the coils of a first portion of the electromagnets in a first direction, while current is conducted through the coils of a second portion of the electromagnets in a second direction. In order to continue rotation greater than 360°, the direction in which the current is conducted through the coils is repeatedly reversed or "commutated," which is sometimes accomplished using alternating current (AC) power. The commutation of the current generally utilizes complicated electronics, especially in high speed applications, which increases the overall size required for the system and the manufacturing costs of the motor.

Additionally, because of the inherent magnetic attraction between the permanent magnets and the teeth, the rotor has a tendency to in particular angular orientations, phenomenon known as "detent torque" or "detent." The detent torque may cause the electric motor to generate different amounts of torque at different angular positions, which may result in vibrations and impair system performance.

Accordingly, it is desirable to provide a rotary motor that can rotate greater than 360° without requiring current commutation. In addition, it is desirable to provide a rotary motor with reduced size and detent torque that is capable of generating high amounts of usable torque. Furthermore, other desirable features and characteristics of the present invention will become apparent from the subsequent detailed description and the appended claims, taken in conjunction with the accompanying drawings and the foregoing technical field and background.

BRIEF SUMMARY

A motor is provided. The motor includes a ferromagnetic member with first and second portions, a conductive wire wrapped around the first portions of the ferromagnetic member, and at least one magnet rotatably coupled to the ferromagnetic member having first and second poles and generating magnetic flux. The ferromagnetic member and the at least one magnet are configured such that at least a portion of the magnetic flux passes from the first pole of the at least one magnet, into the first portions of the ferromagnetic member, to the second portions of the ferromagnetic member, from the second portions of the ferromagnetic member, and into the second pole of the at least one magnet. The at least a portion of the magnetic flux passes through the conductive wire an odd number of times during said passing from the first pole of the at least one magnet to the second pole of the at least one magnet, and when current is conducted through the conductive wire, a Lorentz force is generated between the conductive wire and the at least one magnet causing the at least one magnet to rotate relative to the ferromagnetic member.

A rotary motor is provided. The rotary motor includes a frame, a stator assembly connected to the frame, and a rotor assembly rotatably connected to the frame. The stator assembly includes a first ferromagnetic member connected to the frame having first and second portions and defining a rotor aperture, a plurality of conductive coils wrapped around the first portions of the first ferromagnetic member, and a second ferromagnetic member at least partially connected to the second portions of the first ferromagnetic member and positioned on a side of the first ferromagnetic member having an opening therethrough being concentric with the rotor aperture. The rotor assembly is positioned within the rotor aperture and includes first and second magnets, each of the first and second magnets having first and second poles and generating magnetic flux. The stator assembly and the rotor assembly are configured such that at least a portion of the magnetic flux emanates from the respective first poles of the first and second magnets, passes through the plurality of conductive coils, the first portions of the first ferromagnetic member, the second portions of the first ferromagnetic member, and the second ferromagnetic member, and enters the respective second poles of the first and second magnets, and when current is conducted through the plurality of conductive coils, a Lorentz force is generated between the stator assembly and the rotor assembly causing the rotor assembly to rotate relative to the stator assembly.

BRIEF DESCRIPTION OF THE DRAWINGS

The present invention will hereinafter be described in conjunction with the appended drawing figures, wherein like numerals denote like elements, and in which.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description. It should also be noted that FIGS. 1-10 are merely illustrative and may not be drawn to scale.

FIG. 1 to FIG. 10 illustrate a motor. The motor includes a ferromagnetic member with first and second portions, a conductive wire wrapped around the first portion of the ferromagnetic member, and a magnet, rotatably coupled to the ferromagnetic member, having first and second poles and generating magnetic flux. The ferromagnetic member and the magnet are configured such that at least a portion of the magnetic flux passes from the first pole of the magnet, into the first portion of the ferromagnetic member, to the second portion of the ferromagnetic member, from the second portion of the ferromagnetic member, and into the second pole of the magnet. The magnetic flux passes through the conductive wire an odd number of times between passing from the first pole of the magnet to the second pole of the magnet, and when current is conducted through the conductive wire, a Lorentz force is generated between the conductive wire and the magnet causing the magnet to rotate relative to the ferromagnetic member.

Figure 1:
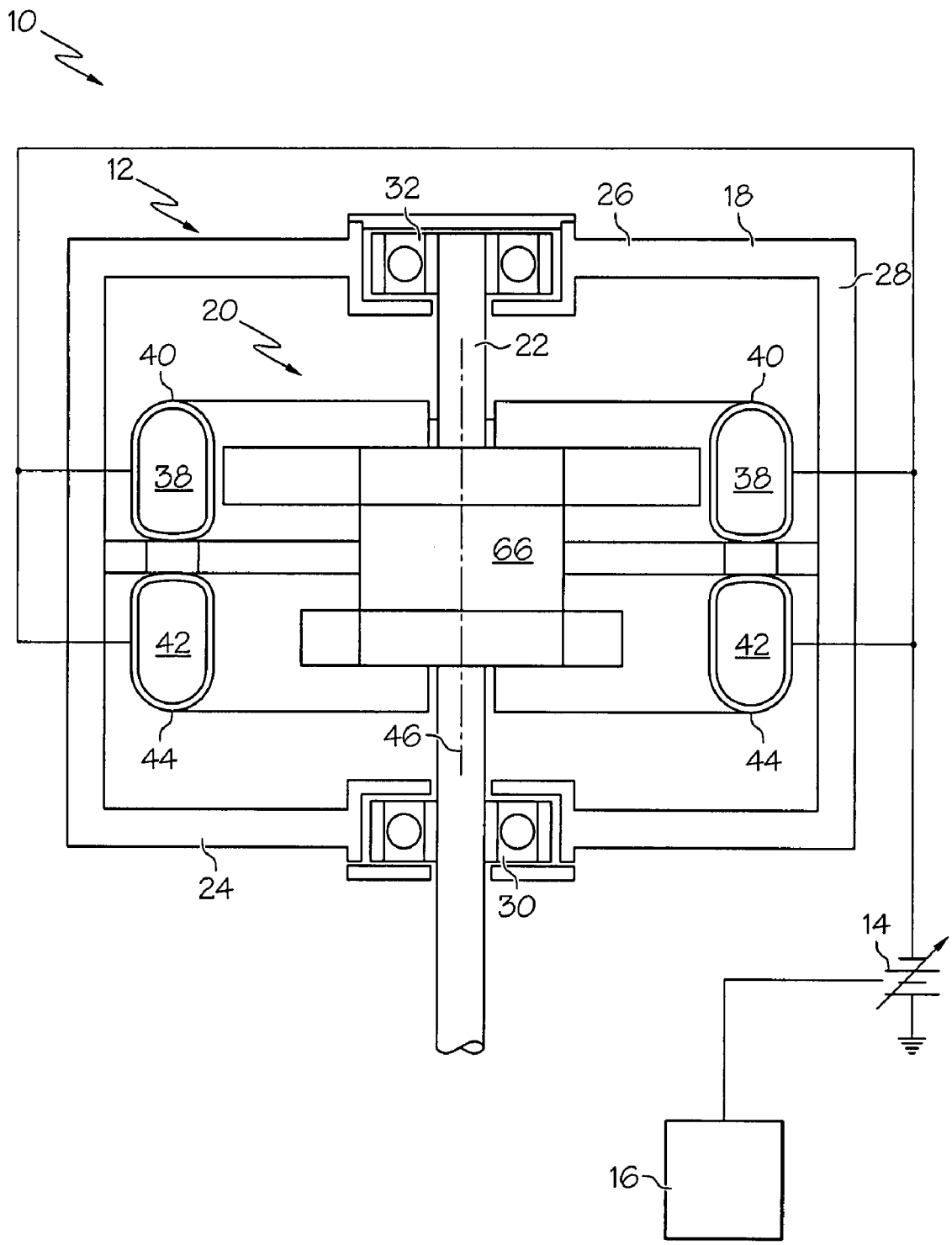
FIG. 1 is a schematic cross-sectional view of an actuator system.

FIG. 1 illustrates an actuator system 10, according to one embodiment of the present invention. The actuator system 10 includes a motor 12 (or actuator), a power supply 14, and a controller 16.

Still referring to FIG. 1, the motor 12, in the depicted embodiment, includes a housing 18 (or frame), an actuation assembly 20, and a shaft 22. Although only shown in cross-section, the housing 18 is substantially circular (or cylindrical) and includes a lower wall 24, an upper wall 26, and a sidewall 28. As shown the sidewall 28 interconnects the lower and upper walls 26 at respective peripheries thereof. The housing 18 also includes a lower bearing 30 and an upper bearing 32 connected to central portions of the respective lower and upper walls 26. As will be appreciated by one skilled in the art, each of the bearings 30 and 32 includes inner and outer members interconnected by a plurality rolling elements.

Figure 2:
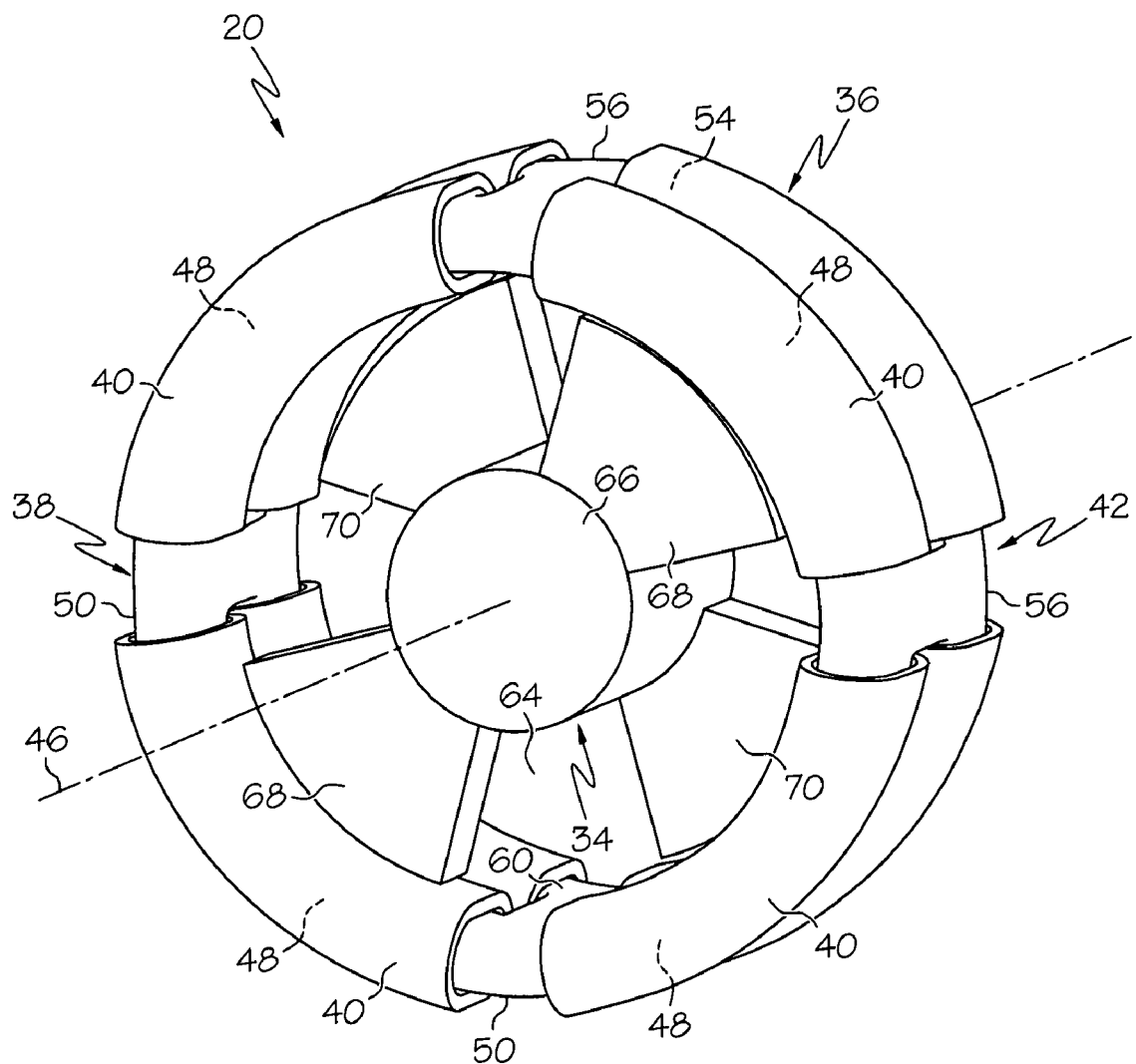
FIG. 2 is an isometric view of an actuation assembly according to one embodiment of the present invention.
Figure 3:
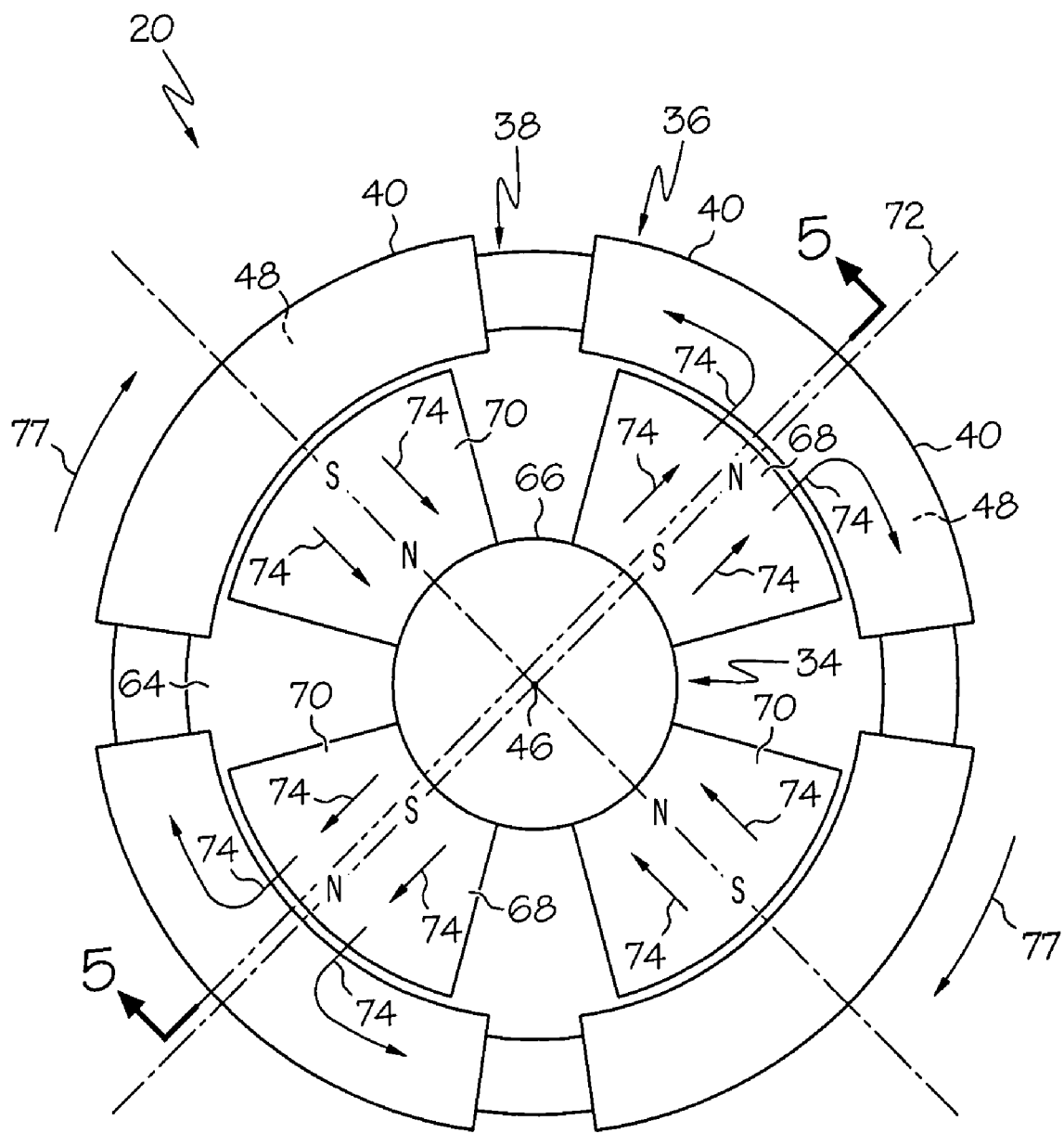
FIG. 3 is a top plan view of the actuation assembly of FIG. 2.
Figure 4:
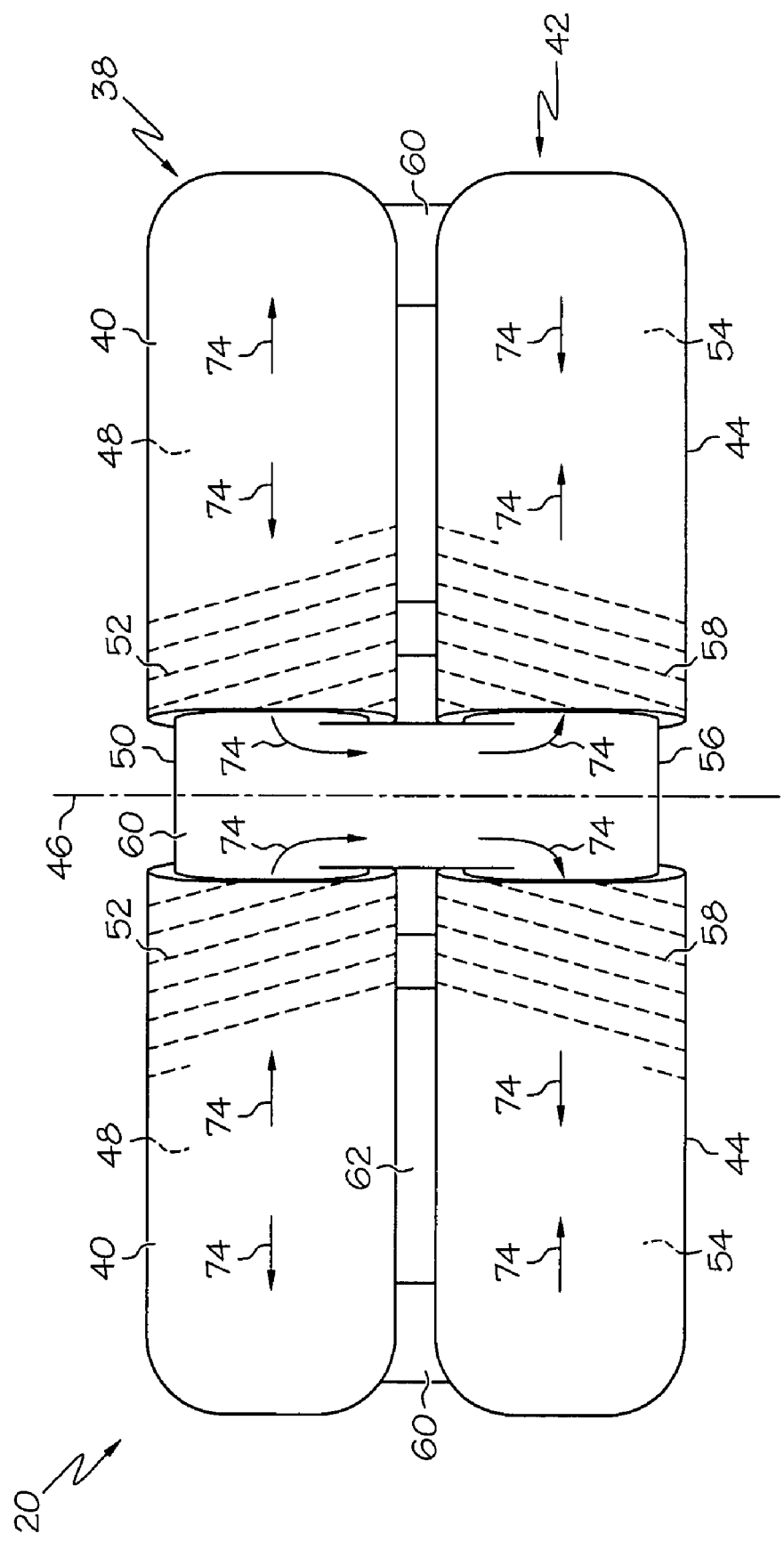
FIG. 4 is a side view of the actuation assembly of FIG. 2.

Referring to FIGS. 2-4, in one embodiment, the actuation assembly 20 includes a rotor assembly 34 and a stator assembly 36. The stator assembly 36 includes a first annular member 38, first conductive coils 40 (or first coil portions), a second annular member 42, and second conductive coils 44 (or second coil portions). The first annular member 38 has a circular opening therethrough that is centered on a central axis 46 (congruent to a primary axis thereof) and includes coil-covered (or first) portions 48 and exposed (or second) portions 50. The first conductive coils 40 are on and substantially cover the coil-covered portions 48 of the first annular member 38 and, although shown as being solid for clarity, are made of conductive wire that is wrapped around the coil-covered portions 48 in a first direction, as indicated in an exaggerated manner by the dashed lines 52 in FIG. 4.

In the embodiment illustrated in FIGS. 2-4, the second annular member 42 is also centered on the central axis 46 (congruent to a primary axis thereof), is similar to the first annular member 38, and likewise includes coil-covered portions 54 and exposed portions 56. The second conductive coils 44, in a manner similar to the first conductive coils 40, are on and substantially cover the coil-covered portions 54 of the second annular member 42 and are made of conductive wire that is wrapped around the coil-covered portions in a second direction, as indicated by the dashed lines 58 in FIG. 4. That is, the second conductive coils 44 are wrapped around the second annular member 42 in a direction that is opposite the direction in which the first conductive coils 40 are wrapped around the first annular member 38.

The actuation assembly 20 also includes shunts (or shunt members) 60 connected to the exposed portions 50 of the first annular member 38 and the exposed portions 56 of the second annular member 42 at opposing ends thereof. The first annular member 38, the second annular member 42, and the shunts are made of a ferromagnetic material, such as iron and/or steel. As such, the first and second annular members 38 and 42 may be referred to as "ferromagnetic members." The conductive wire within the first and second conductive coils 40 and 44 is made of an electrically conductive material, such as copper and/or gold.

Referring specifically to FIG. 4, a gap 62 lies between the first and second conductive coils 40 and 44. As shown in FIGS. 2 and 3, a rotor aperture 64 is formed within the openings through the first and second annular members 38 and 42. The rotor aperture 64, like the openings, is substantially circular and centered on the central axis 46.

As illustrated in FIGS. 1-3, the rotor assembly 34 is positioned within the rotor aperture 64 and includes a central rotor component 66, a first set of magnets (or first magnets) 68, and a second set of magnets (or second magnets) 70. The central rotor component 66 is cylindrically shaped and positioned such that a primary axis thereof is congruent with the central axis 46. The central rotor component 66 may be made of the same ferromagnetic material as the first and second annular members 38 and 42 and the shunts 60. In the depicted embodiment, the first and second magnets 68 and 70 are wedge-shaped and arranged such that a width thereof increases as the magnets 68 and 70 extend away from the central axis 46. Each of the magnets 68 and 70 has a first, or north, pole (N) and a second, or south, pole (S). The first magnets 68 are connected to opposing sides of a first end of the central rotor component 66 positioned within the opening of the first annular member 38 and arranged such that the second pole of each first magnet 68 is positioned between the central axis 46 and the first pole of the same magnet 68. The second magnets 70 are connected to opposing sides of a second end of the central rotor component 66 positioned within the opening of the second annular member 42 and arranged such that the first pole of the second magnet 70 is positioned between the central axis 46 and the second pole of the same magnet 70.

Figure 5:
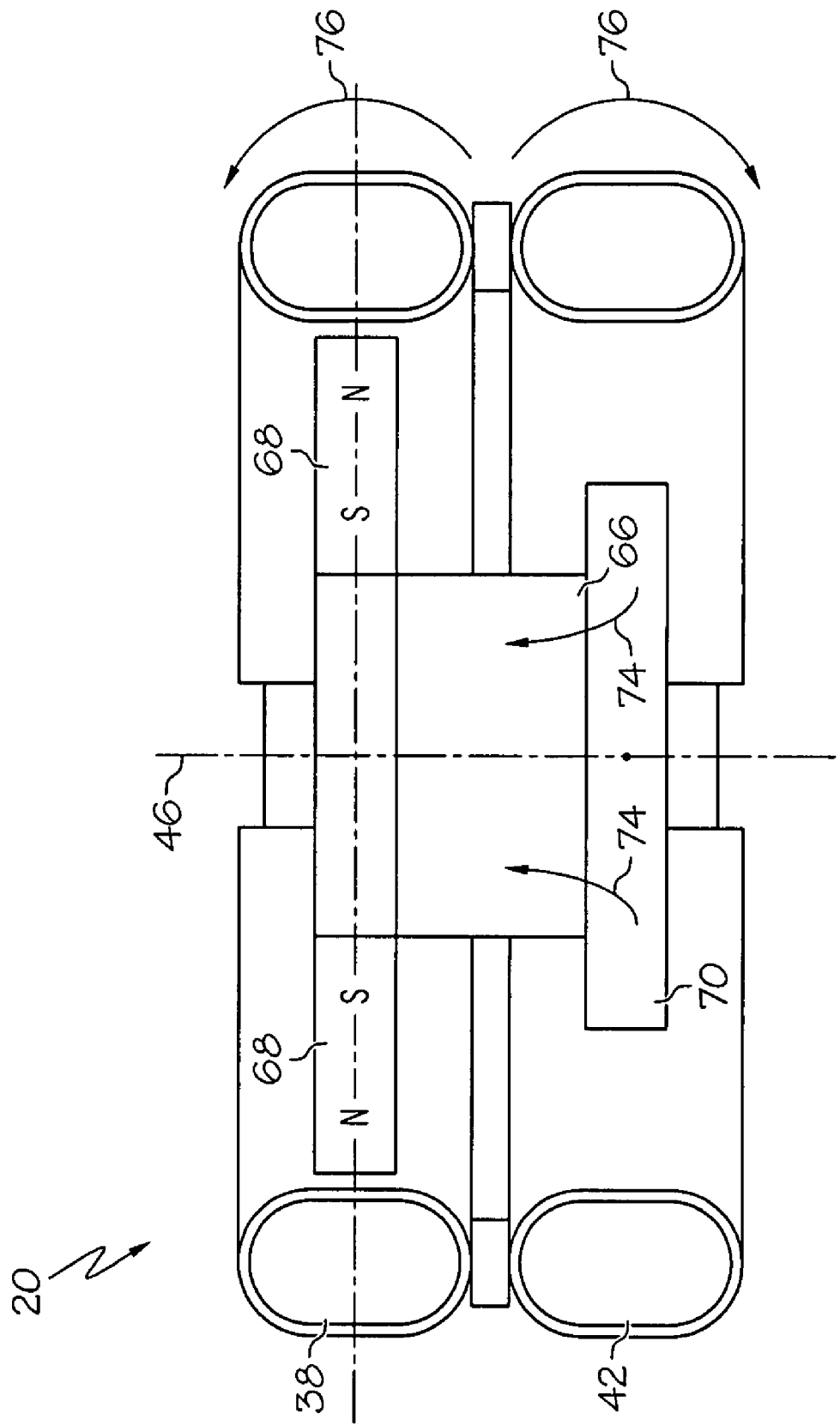
FIG. 5 is a cross-sectional side view of the actuation assembly of FIG. 3 taken along line 5-5.

As shown in FIGS. 3 and 5, a line 72 that extends through the first and second poles of one of the first magnets 68 intersects the central axis 46, as well as the first and second poles of the other first magnet 68, and is substantially perpendicular to the central axis 46. A line 74 that extends through the first and second poles of one of the second magnets 70 intersects the central axis 46, as well as the first and second poles of the other second magnet 70, and is also substantially perpendicular to the central axis 46 and substantially orthogonal to line 72.

The arrangement of the first and second annular members 38 and 42, the first and second magnets 68 and 70, and the central rotor component 66 provides for magnetic flux to pass to and from the first and second magnets 68 and 70 as indicated by the flux arrows 74 shown in FIGS. 3-5. As shown specifically in FIG. 3, the magnetic flux may be understood to emanate from first poles (N) of the first magnets 68 and pass through the first conductive coils 40 into the coil-covered portions 48 of the first annular member 38. Although in FIG. 3 the magnetic flux is shown as only passing through the first conductive coils 40 near the first magnets 68, it should be understood that as the rotor assembly 34 rotates (as will be described below), the magnetic flux in effect passes through all of the first conductive coils 40 into the respective coil-covered portions 48 of the first annular member 38.

As shown in FIGS. 3 and 4, the magnetic flux then passes through the coil-covered portions 48 of the first annular member 38, and into the exposed portions 50 of the first annular member 38. From the exposed portions 50 of the first annular member 38, the flux passes though the shunts 60 into the exposed portions 56 of the second annular member 42. As such, the magnetic flux passes through the first conductive coils 40 only once (i.e., an odd number of times). That is, in the embodiment shown, the magnetic flux passes through the first conductive coils 40 only once, as the flux enters the first annular member 38, and then exits the first annular member 38 without passing through the first conductive coils 40 a second time.

From the exposed portions of the 56 of the second annular member 42, the flux passes into the coil-covered portions 54 of the second annular member 42, through the second conductive coils 44, and into the second poles (S) of the second magnets 70. Thus, the flux also passes through the second conductive coils 44 only once. That is, the magnetic flux enters the coil-covered portions 54 of the second annular member 42 without passing through the second conductive coils 44, and then passes through the second conductive coils 44 once as it exits the second annular member 42. Although in FIG. 3 the magnetic flux is shown as only passing through the second conductive coils 40 near the second magnets 70, it should be understood that as the rotor assembly 34 rotates, the flux in effect passes through all of the second conductive coils 44. From the second poles (S) of the second magnets 70, the flux continues through the first poles (N) of the second magnets 70.

As shown in FIG. 5, the magnetic flux then passes towards the first magnets 68 through the central rotor component 66. Referring again to FIG. 3, the flux then reenters the first magnets 68 at the second poles (S) thereof, and returns to the first poles (N) of the first magnets 68, thus completing a magnetic circuit through the actuation assembly 20.

Referring again to FIG. 1, the shaft 22 is connected to and/or extends through the central rotor component 66 about the central axis 46. The shaft 22 is connected to the upper bearing 32 an end thereof on a side of the actuation assembly 20 adjacent to the first annular member 38. The shaft 22 is also connected to and extends through the lower bearing 30 on a side of the actuation assembly 20 adjacent to the second annular member 40. As such, the stator assembly 36 is connected to the housing 28 in a fixed position, while the rotor assembly 34 is rotatably connected to the housing 28 and/or coupled to the stator assembly 36.

The power supply 14 may be any one of various types of variable direct current (DC) power supplies. As shown, the power supply 14 is electrically connected to the first conductive coils 40 on the first annular member 38 and the second conductive coils 44 on the second annular member 42. The controller 16 is in operable communication with the power supply 14. The controller 16, or computer control console, may be in the form of a computer, or computing system, having a memory (i.e., computer-readable medium) for storing a set of instructions (i.e., software) and a processor connected to the memory for executing the instructions, as is commonly understood in the art. The instructions stored within the controller 14 may include the methods and processes for controlling the motor 12 as described below.

Referring to FIG. 1, during operation, the controller 16 activates the power supply 14 such that a DC voltage is applied to the first and second conductive coils 40 and 44 such that current is conducted through the conductive wire in the conductive coils 40 and 44. Due to the opposing directions in which the first and second conductive coils 40 and 44 are wrapped around the respective first and second annular members 38 and 42, the current conducts around the first and second annular members 38 and 42 in opposite directions, as indicated by current arrows 76 shown in FIG. 5.

As the magnetic flux passes from the first magnets 68 through the first conductive coils 40 and into the first annular member 38, a Lorentz force (i.e., torque) is generated between the first conductive coils 40 and the first magnets 68 causing the rotor assembly 34 to rotate (e.g., clockwise) relative to the stator assembly 36, as indicated by the rotation arrows 77 shown in FIG. 3. In a similar manner, as the magnetic flux passes from the second annular member 42 through the second conductive coils 44 and into the second magnets 70, a Lorentz force is generated between the second conductive coils 44 and the second magnets 70 in the same direction as the Lorentz force between the first conductive coils 40 and the first magnets 68, further causing the rotation of the rotor assembly 34 relative to the stator assembly 36. As will be appreciated by one skilled in the art, the Lorentz generated successfully rotates the rotor assembly 34 due, at least in part, to the fact that the magnetic flux passes through the first and second conductive coils 40 and 44 an odd number of times (e.g., once).

As the current continues to conduct through the first and second conductive coils 40 and 44, the rotor assembly 34 rotates in complete, continuous turns (i.e., greater than 360°) with the current being conducted through the conductive wire of each respective conductive coil 40 and 44 in a single direction. That is, the current does not have to be commutated in order the rotor assembly 34 to rotate 360° or more. More specifically, the rotation of the rotor assembly 34 may be accomplished by applying DC power, as opposed to AC power, to the conductive coils 40 and 44. The speed of rotation may be adjusted by altering the voltage of the DC power applied. That is, the rotation rate increases proportionally with increases to the voltage. Additionally, the direction of rotation may be changed by changing the polarity of the DC power and/or reversing the directions in which the conductive wire in the coils 40 and 44 are wrapped around the annular members 38 and 42.

One advantage of the motor described above is a rotary motor is provided that is capable of continuous rotation greater than 360° without commutating the current conducting through the coils. Thus, DC power may be used to power the motor, and the electronics that are used to operate and control the motor may be greatly simplified. As a result, the costs involved in manufacturing the motors, and associated systems, are reduced, as is the overall size of the system.

Figure 6:
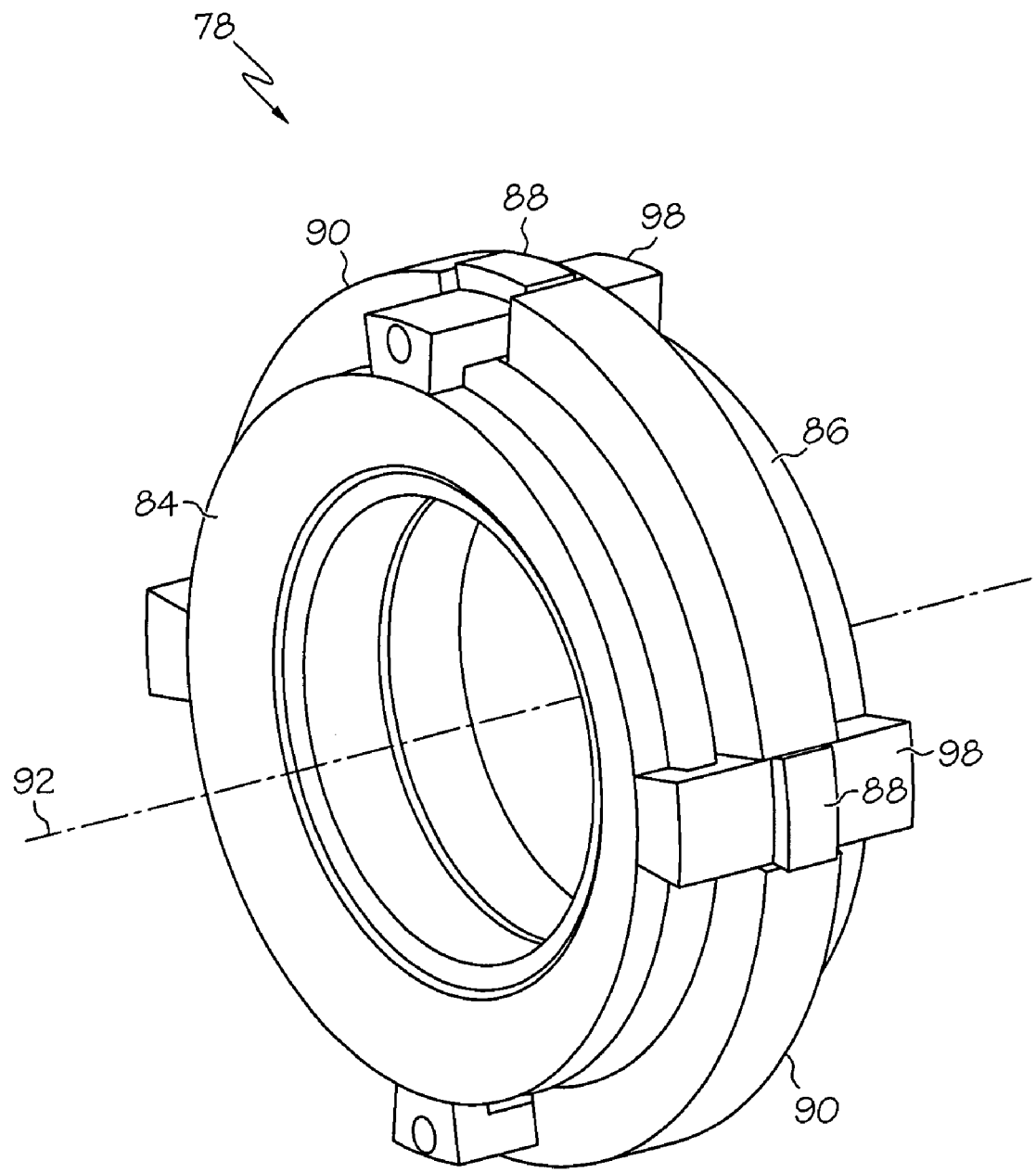
FIG. 6 is an isometric view of an actuation assembly according to another embodiment of the present invention.
Figure 7:
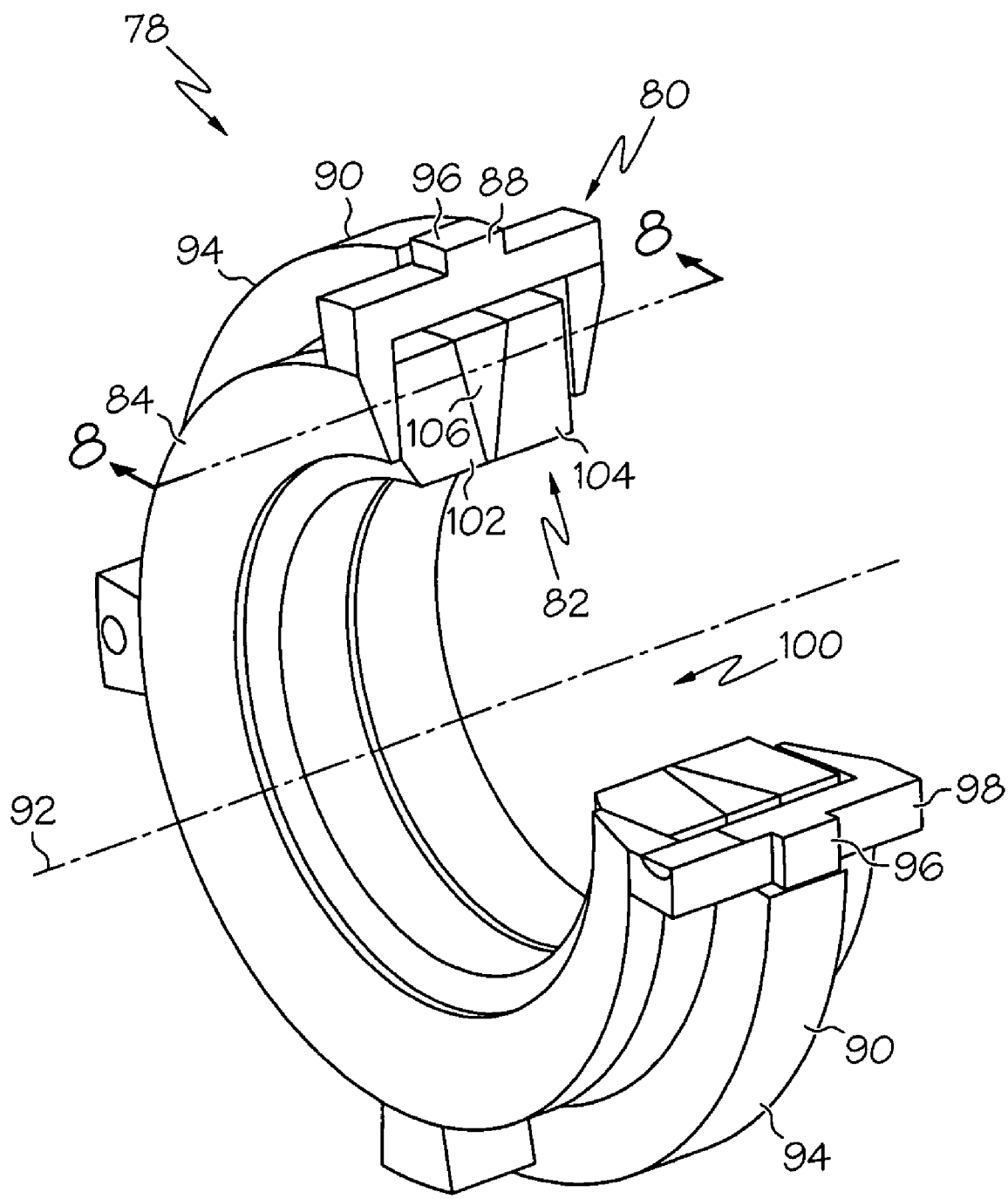
FIG. 7 is a sectioned isometric view of the actuation assembly of FIG. 6.
Figure 8:
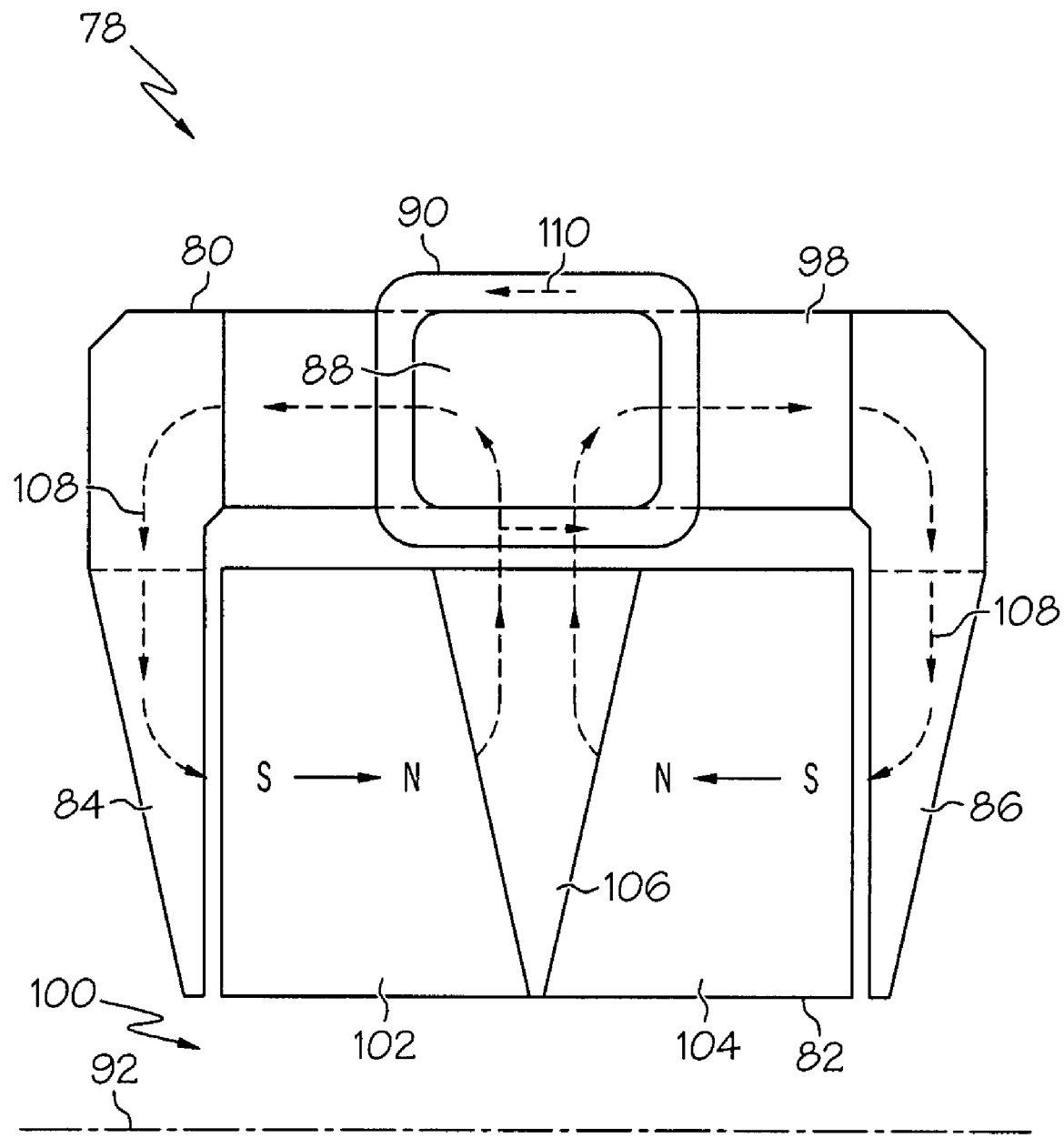
FIG. 8 is a cross-sectional view of the actuation assembly of FIG. 7 taken along line 8-8.

FIGS. 6-8, illustrate an actuation assembly 78, according to another embodiment of the present invention. The actuation assembly 78 includes a stator assembly 80 and a rotor assembly 82. The stator assembly 80 includes a first annular member 84, a second annular member 86, a third annular member 88, and conductive coils 90 (or coil portions). The first and second annular members 84 and 86 have circular opening therethrough that are centered on a central axis 92. As shown most clearly in FIG. 8, the first and second annular members 84 and 86 have substantially triangle-shaped cross-sections and are arranged such that a thickness thereof decreases as the first and second annular members 84 and 86 extend towards the central axis 92. A hypotenuse of the cross-sections of the first and second annular members 84 and 86 face away from the rotor assembly 82.

Referring to FIGS. 7 and 8, the third annular member 88 is centered, as measured along the central axis 92, between the first and second annular members 84 and 86 and circumscribes and outer edge of the rotor assembly 82. The third annular member 88 has a substantially rectangular cross-section and like the first and second annular members 84 and 86 is centered on the central axis 92. The third annular member 88 includes coil-covered (or first) portions 94 and exposed (or second) portions 96. The conductive coils 90 are on and substantially cover the coil-covered portions 94 of the third annular member, and although shown as being solid for clarity, are made of conductive wire that is wrapped around the coil-covered portions 94. In the embodiment shown in FIGS. 6-8, each of the conductive coils 90 are wrapped around the coil-covered portions 94 of the third annular member in the same direction.

The actuation assembly 78 also includes shunts (or shunt members) 98 that interconnect the exposed portions 96 of the third annular member 88 to both the first and second annular members 84 and 86. The first, second, and third annular members 84, 86, and 88 and the shunts 98 are made of a ferromagnetic material, such as iron and/or steel. The conductive wire within the conductive coils 90 is made of an electrically conductive material, such as copper and/or gold. As shown in FIGS. 7 and 8, a rotor aperture 100 is formed within the openings through the first, second, and third annular members 84, 86, and 88. The rotor aperture 64, like the openings, is substantially circular and centered on the central axis 92.

Still referring to FIGS. 7 and 8, the rotor assembly 82 is positioned within the rotor aperture 100 between the first and second annular members 84 and 86 and includes a first annular magnet 102, a second annular magnet 104, and a central annular member 106. The first and second annular magnets 102 and 104 are centered on, and symmetric about, the central axis 92 and have trapezoidal cross-sections with the longer of the two parallel sides being between the shorter of the two parallel sides and the central axis 92. Adjacent sides of the first and second annular magnets 102 and 104 nearly contact at the inner edges of the first and second annular magnets 102 and 104 and are arranged such that a wedge-shaped void is formed between the first and second annular magnets 102 and 104. The first and second annular magnets 102 and 104 each have a first or north (N) pole and a second or south (S) pole and are arranged "facing" each other such that the first poles of the first and second annular magnets 102 and 104 are positioned between the second poles of the first and second annular magnets 102 and 104. Although not specifically illustrated, a line that interconnects the first and second poles of the first and second annular magnets 102 and 104 may be substantially parallel to the central axis 92.

The central annular member 106 is symmetric about the central axis 92 and is positioned between the first and second annular magnets 102 and 104 to fill the void formed between the adjacent sides of the first and second annular magnets 102 and 104. As such, the central annular member 106 has a wedge-shaped cross-section with a thickness that decreases as the central annular member extends towards the central axis 92. The central annular member 106 is made of a ferromagnetic material, such as iron and/or steel.

Referring again to FIGS. 7 and 8, the arrangement of the first and second annular members 84 and 86, the first and second annular magnets 102 and 104, and the central annular member 106 provides for a majority of the magnetic flux from the magnets 102 and 104 to flow through the actuation assembly 78, as shown in FIG. 8 by flux path indicators 108. As shown, the magnetic flux may be understood to emanate from the first poles (N) of the first and second annular magnets 102 and 104 and into the central annular member 106. Due to the shape of the annular magnets 102 and 104, the flux is "forced" away from the central axis 92 towards the third annular member 88. The flux then passes through the conductive coils 90 and into the coil-covered portions 94 of the third annular member 88. As will be appreciated by one skilled in the art, because the first and second annular magnets 102 and 104 are symmetric about the central axis 92, as well as being arranged with the first and second poles thereof being aligned in a direction that is substantially parallel to the central axis 92, the magnetic flux generated by the rotor assembly 82 may be radially symmetric about the central axis 92 (i.e., substantially constant around a perimeter of the actuation assembly 78).

Although not specifically shown, the flux flows through the coil-covered portions 94 of the third annular member 88, around a periphery of the rotor assembly 82, through the exposed portions 96 of the third annular member 88, and into the shunts 98. From the shunts 98, one portion of the flux flows to the first annular member 84, while another portion flows to the second annular member 86. Thus, the magnetic flux passes through the conductive coils 90 an odd number of times (e.g., once), as the flux passes into the third annular member 88, and exits the third annular member 88 without passing through the conductive coils 90 again.

From the first and second annular members 84 and 86, the flux returns to the first and second annular magnets 102 and 104 at the second poles (S) thereof. It should be understood that the flux may flow from the portions of the first and second annular members 84 and 86 adjacent to the shunts 98 to other portions of the first and second annular members 84 and 86 before passing into the first and second annular magnets 102 and 104.

The actuation assembly 78 shown in FIGS. 6-8 may be operated in a system similar to actuator system 10 shown in FIG. 1. When a DC voltage is applied to the conductive coils 90, current is conducted through the conductive coils 90 around the third annular member 88 in, for example, a direction as indicated by current arrows 110 shown in FIG. 8. As will be appreciated by one skilled in the art, as the magnetic flux passes from the central annular member 106 through the conductive coils 90 and into the third annular member 88, a Lorentz force (i.e., torque) is generated between the between the conductive coils 90 and the first and second annular magnets 102 and 104 causing the rotor assembly 82 to rotate about the central axis 92 relative to the stator assembly 80. As with the embodiment shown in FIGS. 2-5, the Lorentz generated successfully rotates the rotor assembly 82 due, at least in part, to the fact that the magnetic flux passes through the conductive coils 90 an odd number of times (e.g., once).

Figure 9:
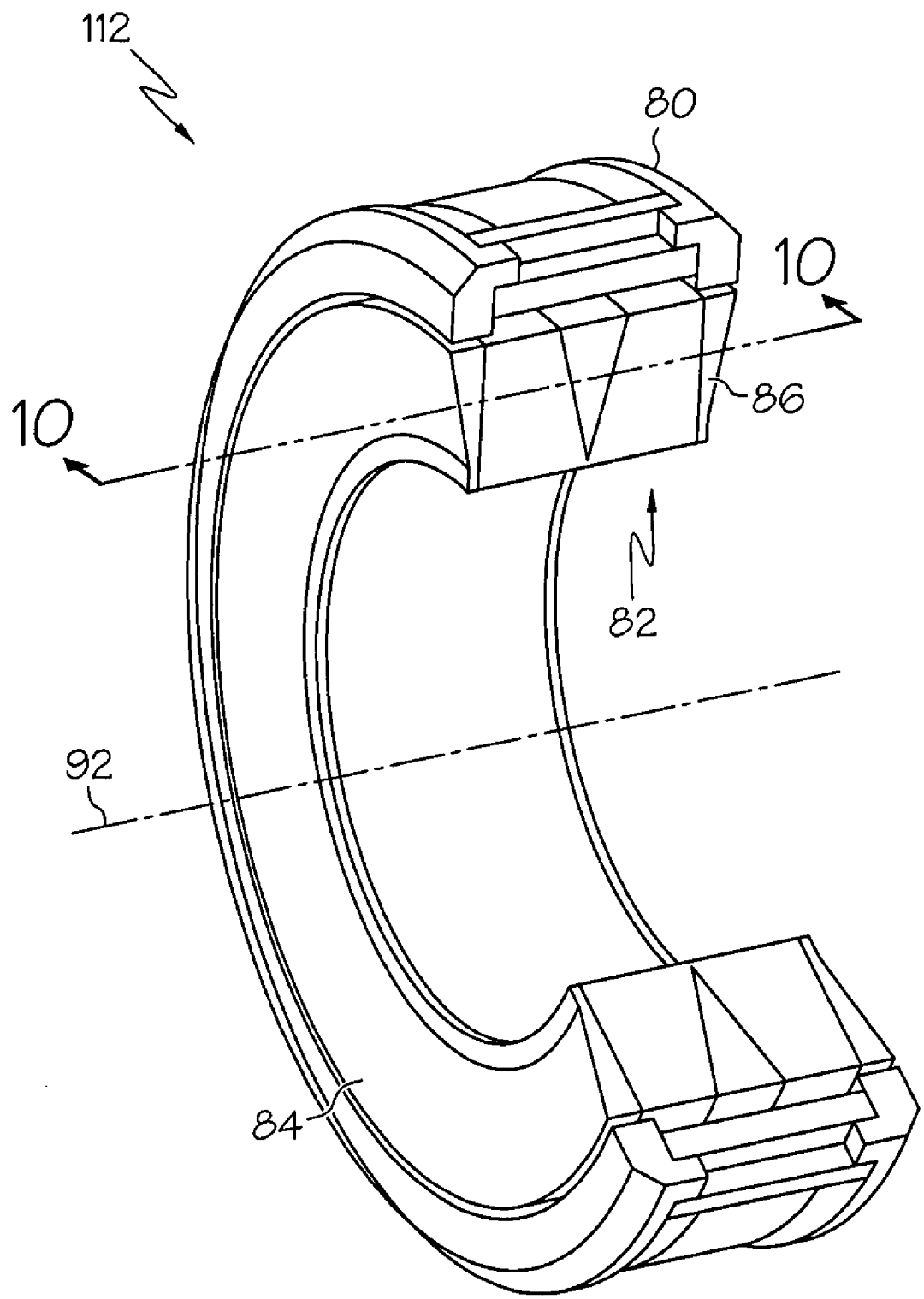
FIG. 9 is a sectioned isometric view of an actuation assembly according to further embodiment of the present invention.
Figure 10:
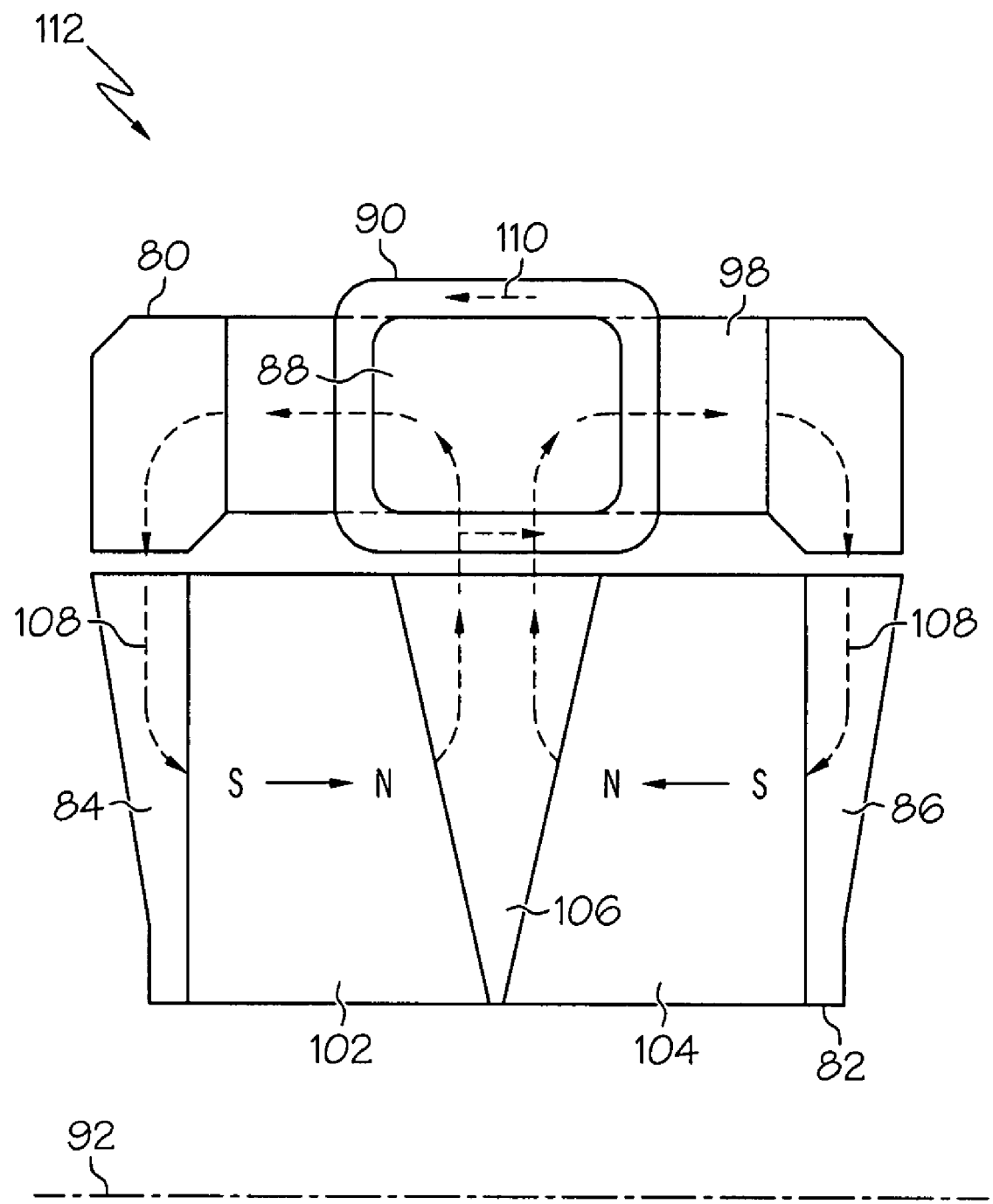
FIG. 10 is a cross-sectional view of the actuation assembly of FIG. 9 taken along line 10-10.

FIGS. 9 and 10 illustrate an actuation assembly 112 according to a further embodiment of the present invention. The actuation assembly 112 shown in FIGS. 9 and 10 is similar to the actuation assembly 78 shown in FIGS. 6-8, and thus includes similar components (indicated by similar reference numerals). Of particular interest in the actuation assembly 112 shown in FIGS. 8 and 9 is the arrangement of the first and second annular members 84 and 86. As shown, the first and second annular members 84 and 86 are connected to and/or form part of the rotor assembly 82. More specifically, the first and second annular magnets are connected to the first and second annular magnets 102 and 104, respectively, rather than the third annular member 88 through the shunts 98. As indicated by flux path indicators 108, the magnetic flux from the first and second annular magnets 102 and 104 passes through the actuation assembly 112 in a manner similar to that shown in FIG. 8 and described above. Thus, when DC power is applied to the conductive coils 90, the first and second annular members 84 and 86 rotate, along with the remainder of the rotor assembly 82, about the central axis 92 relative to the stator assembly 80.

A further advantage of the embodiments illustrated in FIGS. 6-10 is that because the magnetic flux generated by the rotor assembly is symmetric about the central axis, the amount of detent torque experienced by the motor is reduced. As a result, vibration during operation is minimized, which improves overall performance. Additionally, because of the magnetic flux is radially symmetric, the occurrence of "eddy" currents in the ferromagnetic materials in minimized. As a result, power losses in the motor are reduced, which is particularly significant in high-speed applications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

I claim:

1. A motor comprising:
a ferromagnetic member with first and second portions;
a conductive wire wrapped around the first portions of the ferromagnetic member; and
at least one magnet rotatably coupled to the ferromagnetic member having first and second poles and generating magnetic flux, the ferromagnetic member and the at least one magnet being configured such that at least a portion of the magnetic flux passes from the first pole of the at least one magnet, into the first portions of the ferromagnetic member, to the second portions of the ferromagnetic member, from the second portions of the ferromagnetic member, and into the second pole of the at least one magnet, the at least a portion of the magnetic flux passing through the conductive wire an odd number of times during said passing from the first pole of the at least one magnet to the second pole of the at least one magnet and when current is conducted through the conductive wire, a Lorentz force is generated between the conductive wire and the at least one magnet causing the at least one magnet to rotate relative to the ferromagnetic member, wherein said rotation of the at least one magnet relative to the ferromagnetic member is greater than 360° and the current is conducted through the conductive wire in only a first direction during said rotation of the at least one magnet relative to the ferromagnetic member.

2. The motor of claim 1, wherein the ferromagnetic member has an opening therethrough, the conductive wire forms a plurality of conductive coils over the first portions of the ferromagnetic member on opposing sides of the opening, the at least one magnet is positioned within the opening, and each of the second portions of the ferromagnetic member is at least partially positioned between two of the plurality of conductive coils.

3. The motor of claim 2, wherein the ferromagnetic member has a central axis, the opening is substantially circular and concentric with the central axis of the ferromagnetic member, and the at least one magnet rotates about the central axis of the ferromagnetic member, the at least one magnet has first and second surfaces, and a line interconnecting the first and second poles extends through the first and second surfaces of the at least one magnet respectively.

4. The motor of claim 3, further comprising:
a second ferromagnetic member having first and second portions and an opening therethrough that is concentric with the central axis of the ferromagnetic member and positioned on a side of the ferromagnetic member such that the second portions are adjacent to the second surface of the at least one magnet; and
a plurality of ferromagnetic shunts interconnecting the second portions of the ferromagnetic member and the second portions of the second ferromagnetic member such that the at least a portion of the magnetic flux passes from the second portions of the ferromagnetic member, through the plurality of ferromagnetic shunts and the second portions of the second ferromagnetic member, and into the second pole of the at least one magnet.

5. The motor of claim 4, wherein the at least one magnet comprises at least one first magnet and at least one second magnet,
wherein the at least one first magnet being at least partially positioned between two of the conductive coils on the ferromagnetic member such that the second pole of the at least one first magnet is between the central axis of the ferromagnetic member and the first pole and the line interconnecting the first and second poles of the at least one first magnet is substantially perpendicular to the central axis of the ferromagnetic member, and
wherein the at least one second magnet being at least partially positioned between two of the first portions of the second ferromagnetic member such that the first pole of the of the at least one second magnet is between the central axis of the ferromagnetic member and the second pole and the line interconnecting the first and second poles of the at least one second magnet is substantially perpendicular to the central axis of the ferromagnetic member.

6. The motor of claim 5, further comprising a ferromagnetic rotor component interconnecting the at least one first magnet and the at least one second magnet such that the at least a portion of the flux passes from the second portions of the second ferromagnetic member, into the second pole of the at least one second magnet, out of the first pole of the at least one second magnet, through the ferromagnetic rotor component, and into the second pole of the at least one first magnet.

7. The motor of claim 6, wherein the conductive coils on the first portions of the ferromagnetic member are wrapped in a first direction and further comprising a plurality of second conductive coils wrapped around the first portions of the second ferromagnetic member in a second direction such that at least some of the portion of magnetic flux passes from the second portions of the second ferromagnetic member to the first portions of the second ferromagnetic member and from the first portions of the second ferromagnetic member, through the plurality of second conductive coils, and into the second pole of the at least one second magnet and when current is conducted through the second conductive coils, a Lorentz force is generated between the second conductive coils and the at least one second magnet further causing said rotation of the at least one magnet relative to the ferromagnetic member.

8. The motor of claim 7, further comprising a frame, at least one of the ferromagnetic member and the second magnetic member being connected to the frame and the at least one magnet being rotatably connected to the frame.

9. The motor of claim 4, wherein the at least one magnet comprises a first circular magnet and a second circular magnet configured such that the first poles of the first and second circular magnets are positioned between the second poles of the first and second circular magnet and the line interconnecting the first and second poles is substantially parallel to the central axis of the ferromagnetic member.

10. A rotary motor comprising:
a frame;
a stator assembly connected to the frame comprising:
a first ferromagnetic member connected to the frame having first and second portions and defining a rotor aperture;
a plurality of conductive coils wrapped around the first portions of the first ferromagnetic member; and
a second ferromagnetic member at least partially connected to the second portions of the first ferromagnetic member and positioned on a side of the first ferromagnetic member having an opening therethrough being concentric with the rotor aperture; and
a rotor assembly rotatably connected to the frame and positioned within the rotor aperture having first and second magnets, each of the first and second magnets having first and second poles and generating magnetic flux, the stator assembly and the rotor assembly being configured such that at least a portion of the magnetic flux emanates from the respective first poles of the first and second magnets, passes through the plurality of conductive coils, the first portions of the first ferromagnetic member, the second portions of the first ferromagnetic member, and the second ferromagnetic member, and enters the respective second poles of the first and second magnets, and when current is conducted through the plurality of conductive coils, a Lorentz force is generated between the stator assembly and the rotor assembly causing the rotor assembly to rotate relative to the stator assembly.

11. The rotary motor of claim 10, wherein the at least a portion of the magnetic flux passes through the plurality of conductive coils an odd number of times between said passing from the respective first poles of the first and second magnets to the respective second poles of the first and second magnets.

12. The rotary motor of claim 11, wherein said rotation of the rotor assembly relative to the stator assembly is greater than 360° and the current is conducted through the plurality of conductive coils in only a first direction during said rotation.

13. The rotary motor of claim 12, wherein the first ferromagnetic member has a central axis, the rotor aperture is substantially circular and concentric with the central axis of the ferromagnetic member, and a line interconnecting the respective first and second poles of the first and second magnets is substantially parallel to the central axis of the first ferromagnetic member.

14. The rotary motor of claim 13, wherein the second ferromagnetic member comprises a first portion and a second portion, and second portion being adjacent connected to at least one of the first and second magnets, and further comprising a plurality of ferromagnetic shunts interconnecting the second portions of the first ferromagnetic member and the first portion of the second ferromagnetic member.

15. A rotary motor comprising:
a frame;
a stator assembly connected to the frame comprising:
first and second annular ferromagnetic members, each having first and second portions, an opening therethrough, and a central axis, the central axes of the first and second annular ferromagnetic members being substantially congruent, the openings of the first and second annular members jointly forming a rotor aperture;
a plurality of ferromagnetic shunts interconnecting the respective second portions of the first and second annular ferromagnetic members; and
first and second pluralities of conductive coils wrapped around the respective first portions of the first and second annular ferromagnetic members in respective first and second directions; and
a rotor assembly rotatably connected to the frame and positioned within the rotor aperture, the rotor assembly comprising:
at least one first magnet at least partially positioned between two of the first plurality of conductive coils having first and second poles, the second pole of the at least one first magnet being positioned between the central axes and the first pole and a line extending through the first and second poles of the at least one first magnet being substantially perpendicular to the central axes of the first and second annular ferromagnetic members;
at least one second magnet at least partially positioned between two of the second plurality of conductive coils having first and second poles, the first pole of the at least one second magnet being positioned between the central axes and the second pole, a line extending through the first and second poles of the at least one second magnet being substantially perpendicular to the central axes of the first and second annular ferromagnetic members; and
a ferromagnetic rotor component interconnecting the at least one first magnet and the at least one second magnet,
wherein at least some magnetic flux generated by the at least one first magnet emanates from the first pole of the at least one first magnet, passes through the first plurality of conductive coils, the first portions of the first annular ferromagnetic member, the second portions of the first annular ferromagnetic member, the plurality of ferromagnetic shunts, the second portions of the second annular ferromagnetic member, the first portions of the second annular ferromagnetic member, into the second pole of the at least one second magnet, out of the first pole of the at least one second magnet, through the ferromagnetic rotor component, and enters the second pole of the at least one first magnet such that when current is conducted through the first and second pluralities of conductive coils, a Lorentz force is generated between the stator assembly and the rotor assembly causing the rotor assembly to rotate relative to the stator assembly.

16. The rotary motor of claim 15, wherein the at least a portion of the magnetic flux passes through the first plurality of conductive coils an odd number of times between said passing from the first pole of the at least one first magnet to the second pole of the at least one second magnet.

17. The rotary motor of claim 16, wherein said rotation of the rotor assembly relative to the stator assembly is greater than 360° and the current is conducted through the first and second plurality of conductive coils in only a first direction during said rotation.

18. The rotary motor of claim 17, wherein the at least one first magnet comprises two first magnets on opposing sides of the ferromagnetic rotor component, and the at least one second magnet comprises two second magnets on opposing sides of the ferromagnetic rotor component.

19. The rotary motor of claim 18, wherein a line extending through the first and second poles of the two first magnets is substantially orthogonal to a line extending through the first and second poles of the two second magnets.

* * * * *

UNITED STATES PATENT AND TRADEMARK OFFICE
CERTIFICATE OF CORRECTION

| | |
|---|---|
| PATENT NO. | : 7,586,229 B2 |
| APPLICATION NO. | : 11/850525 |
| DATED | : September 8, 2009 |
| INVENTOR(S) | : Bandera |

It is certified that error appears in the above-identified patent and that said Letters Patent is hereby corrected as shown below:

Column 10, lines 30 and 31, "of the of the" should be changed to --of the--.

Signed and Sealed this

Seventeenth Day of November, 2009

David J. Kappos
*Director of the United States Patent and Trademark Office*